United States Patent Office.

CYPRIEN MARIE TESSIÉ DU MOTAY, OF METZ, FRANCE, AND EDOUARD KARCHER, OF SAARBRUCK, PRUSSIA.

Letters Patent No. 75,538, dated March 17, 1868.

IMPROVEMENT IN THE MANUFACTURE OF FLUORIDE OF SILICIUM.

*The Schedule referred to in these Letters Patent and making part of the same.*

TO WHOM IT MAY CONCERN:

Be it known that we, CYPRIEN MARIE TESSIÉ DU MOTAY, of Metz, in the Empire of France, and EDOUARD KARCHER, of Saarbruck, in the Kingdom of Prussia, have invented certain new and useful Improvements in the Manufacture of Fluoride of Silicium; and we hereby declare the following to be a full, clear, and exact description of the same.

When fluoride of calcium is added to silicious copper ores, a certain quantity of fluoride of silicium is disengaged. Gay-Lussac has also shown that by dissolving, at a high temperature, silicic acid with fluoride of calcium, fluoride of silicium is obtained; but the quantity of fluorine gained from the fluoride of calcium, to produce fluoride of silicium, is not more than thirty (30) per cent. of the total weight of the fluorine contained in the said fluoride of calcium.

The reaction hereafter described, and which is the foundation of the present invention, enables us to obtain, according to the proportions of the added matters, from sixty-six (66) to eighty-eight (88) per cent. of the total weight of the fluorine contained in the fluoride of calcium employed in the docimastic production of fluoride of silicium.

By dissolving in a closed crucible, furnished with tubes, in the presence of carbon, an intimate mixture of eleven (11) equivalents of silica and eighteen (18) equivalents of fluoride of calcium, we recover, first, four (4) equivalents of fluoride of silicium, sixty-six (66) per cent. of the fluorine contained in the fluoride of calcium; second, six (6) equivalents of oxide of carbon, due to the reaction of the carbon on the oxygen of silica in presence of the fluorine in the fluoride of calcium.

In this reaction, heretofore unknown, the carbon acts as a reducing-element of part of the oxygen contained in the silica, and aids the direct union of the fluorine and the silicium to produce fluoride of silicium. By proportionately increasing the quantity of silica and of carbon, without increasing the fluoride of calcium, and by adding to the mixture, to render it fusible, a corresponding proportion of aluminous earth, we are enabled, under the same circumstances, to obtain eighty-eight (88) per cent. of the fluorine in the fluoride of calcium employed.

We obtain commercially on a large scale, with similar products to those obtained in the closed crucibles, the reaction above described, by one of the two following methods:

First method. We manufacture blocks, containing eleven (11) equivalents of silica and eighteen (18) equivalents of fluoride of calcium, thirty (30) equivalents of carbon, and four (4) or five (5) parts of aluminous earth. We dry them, then dissolve them in a retort or in a cupola, fitted at its mouth with a condensing-apparatus, for transforming the fluoride of silicium produced into hydrofluor silicic acid. In this method the carbon employed for the reduction of the oxygen of the silica being contained in the blocks, the coke or other fuel used to obtain the fusion of the gangue does not exceed the quantity necessary to fuse the said gangue.

Second method. In a blast-furnace, similar to those employed for the reduction of iron ores, we reduce and dissolve blocks, containing eleven (11) equivalents of silica, eighteen (18) of fluoride of calcium, and four (4) or five (5) parts of aluminous earth, by adding to each charge of blocks a sufficient quantity of coke or other fuel to produce at the same time the reduction of the oxygen of the silica and the fusion of the fluoric gangue. It is thought that in this method the oxide of carbon generated at the tuyere, by the combustion of the fuel, exercises, as much as the carbon, a reducing action on the oxygen of the silica contained in the fluoric gangue.

From the foregoing facts it will be seen that the carbon, employed as an agent for reducing the oxygen contained in silica dissolved and combined with fluoride of calcium, is an indispensable agent for docimastically producing fluoride of calcium on a commercial scale.

Having now described the nature of our invention, and the manner in which the same is or may be carried into effect, we would state, in conclusion, that what we claim, and desire to secure by Letters Patent, is—

The manufacture of fluoride of silicium, by reducing the oxygen of silica by means of carbon or carbonated compounds in presence of fluoride of calcium, substantially in the manner herein described.

In testimony whereof, we have signed our names to this specification before two subscribing witnesses.

E. KARCHER,
C. TESSIÉ DU MOTAY.

Witnesses:
   CH. ARMENGAUD,
   C. LAFOVD.